United States Patent
Rastogi

(10) Patent No.: US 10,603,812 B2
(45) Date of Patent: Mar. 31, 2020

(54) PROCESS OF MAKING COMPREG MULTI-COLORED LAMINATED WOOD AND UTILITY, ORNAMENTAL, DECORATIVE PRODUCTS THEREOF

(71) Applicant: Knitpro International, Noida (IN)

(72) Inventor: A. K. Rastogi, Noida (IN)

(73) Assignee: Knitpro International, Noida (IN)

(*) Notice: Subject to any disclaimer, the term of this patent is extended or adjusted under 35 U.S.C. 154(b) by 16 days.

(21) Appl. No.: 15/969,674

(22) Filed: May 2, 2018

(65) Prior Publication Data

US 2019/0105799 A1 Apr. 11, 2019

(30) Foreign Application Priority Data

Oct. 10, 2017 (IN) .............................. 201711035977

(51) Int. Cl.
| | | |
|---|---|---|
| *B27M 1/00* | (2006.01) | |
| *B27D 1/00* | (2006.01) | |
| *B27K 3/00* | (2006.01) | |
| *B27K 5/00* | (2006.01) | |
| *B32B 21/00* | (2006.01) | |
| *B27M 1/08* | (2006.01) | |
| *B27K 3/15* | (2006.01) | |
| *B27D 1/04* | (2006.01) | |
| *B27K 5/02* | (2006.01) | |
| *B32B 21/14* | (2006.01) | |

(52) U.S. Cl.
CPC ................. *B27M 1/08* (2013.01); *B27D 1/04* (2013.01); *B27K 3/15* (2013.01); *B27K 5/02* (2013.01); *B32B 21/14* (2013.01); *B27K 2200/30* (2013.01)

(58) Field of Classification Search
CPC .. B27M 1/00; B27M 1/08; B27D 1/00; B27D 1/04; B27K 3/00; B27K 3/10; B27K 3/15; B27K 5/00; B27K 5/02; B32B 21/00; B32B 21/10; B32B 21/14
See application file for complete search history.

(56) References Cited

U.S. PATENT DOCUMENTS 1,198,040 A 9/1916 Landau
5,348,621 A * 9/1994 Rudy ...................... C08B 15/02
162/100

(Continued)

FOREIGN PATENT DOCUMENTS

CN 104742212 A 7/2015

*Primary Examiner* — Jacob T Minskey
*Assistant Examiner* — Matthew Hoover
(74) *Attorney, Agent, or Firm* — Melissa M. Hayworth

(57) ABSTRACT

The invention is a process including the steps of manufacturing of compreg laminated wood and transforming the wood thus obtained to ornamental and utility products, including steps of quality checking, veneer selection, Impregnation of veneer with solution of dye and thermosetting resin, drying in kiln, glue spreading followed by bunching, followed by cooling resulting in creation of slab, followed by trimming & cutting of slabs into strips of small sizes, shaping drawing on the sheet as per the profile required, shaping and profiling by CNC Router Machines, grinding and shaping by expert craftsman to bring out the color patterns, end rounding for smooth edges, grinding using various grits of emery wheels for surface finish, polishing/buffing for mirror like surface finish.

9 Claims, 3 Drawing Sheets

(56) References Cited

U.S. PATENT DOCUMENTS

| | | | |
|---|---|---|---|
| 5,652,065 A * | 7/1997 | Park | B27M 1/02 |
| | | | 428/537.1 |
| 8,372,520 B2 | 2/2013 | Parker | |
| 2005/0145324 A1 | 7/2005 | Huang | |
| 2014/0196618 A1* | 7/2014 | Pervan | B41J 3/407 |
| | | | 101/32 |

* cited by examiner

PROCESS OF MAKING COMPREG MULTI-COLORED LAMINATED WOOD AND UTILITY, ORNAMENTAL, DECORATIVE PRODUCTS THEREOF

FIELD OF INVENTION

The present invention generally relates to a process of making wood and products from such manufactured wood. More particularly, the process of making compreg multi-coloured laminated wood and transforming the wood thus obtained to ornamental and utility products with natural high gloss, including jewelry, house decor, kitchenware, table ware, furniture, sporting goods and the likes.

BACKGROUND OF THE INVENTION

The method of processing wood to obtain attractive products used in decoration and utility has a long history. Thousand years ago, Chinese shaved wood and glued it together for use. Later on English and French are reported to have worked on the principles of plywood. The processed wood comprises of a range of derivative wood products that are manufactured by binding or fixing the strands, particles, veneers, fibers or boards of wood along with adhesives such as liquid animal glue, resin from tree sap, bee wax etc., to form composite materials. There are various methods used to process the wood and utilize raw wood to create various ornaments. Many process use chemicals and other adhesives that help to prepare the raw wood as processed wood. Some examples of processed wood are wood pulping, manufacturing of timber, manufacturing of compreg wood, wood chipping, and pre-fabricated wood etc. having variety of applications such as in home construction, furniture, jewelry making, household goods, weapons, sporting goods, furniture, decorative items etc. There are existing prior arts that discuss about the manufacturing of wooden ornaments and their process.

Patent application CN 104742212 discloses a method of jewelry processing technology, and more particularly to a method for producing Populuseuphratica. In said prior patent application ebony wood is processed into jewelry with wood beads. The method uses the steps of selection of wood, preparing embryo, rough grinding followed by fine grinding and punching.

Another U.S. Pat. No. 1,198,040 discusses about the method of impregnation of wood. In the prior art process, chemicals are impregnated into the wood by pressure and if required they are subjected to vacuum.

Another U.S. Pat. No. 8,372,520 B2 discusses about a composite wood product where wood used for manufacturing composite wood product is selected from pine, fir, hemlock, cedar and spruce and wood veneers are selected from poplar, gum, birch, alder and aspen. Cited method includes the process of veneer making followed by manufacturing composite wood product.

Another Patent application US20050145324 A1 discusses about the bendable thin wood process. The main steps involved in this prior art are impregnation of wood under high pressure and vacuum conditions, covering the wood by colored paper. The final product is fire withstanding, water proof, and chemical resistant, scratch proof, color fast and paint free.

Generally the prior arts disclosed above discuss about the process involved in the manufacturing of ornamental wooden product including basic steps: selection of wood, measuring of article size, designing and shaping of article, finishing of end product and drilling in product. The present invention provides a process of manufacturing compreg laminated wood by using specially designed vessels for manufacturing wooden products which are durable, cost effective and attractive in designs which can be further used for making attractive ornamental and utility products.

SUMMARY OF THE INVENTION

Figure 1:
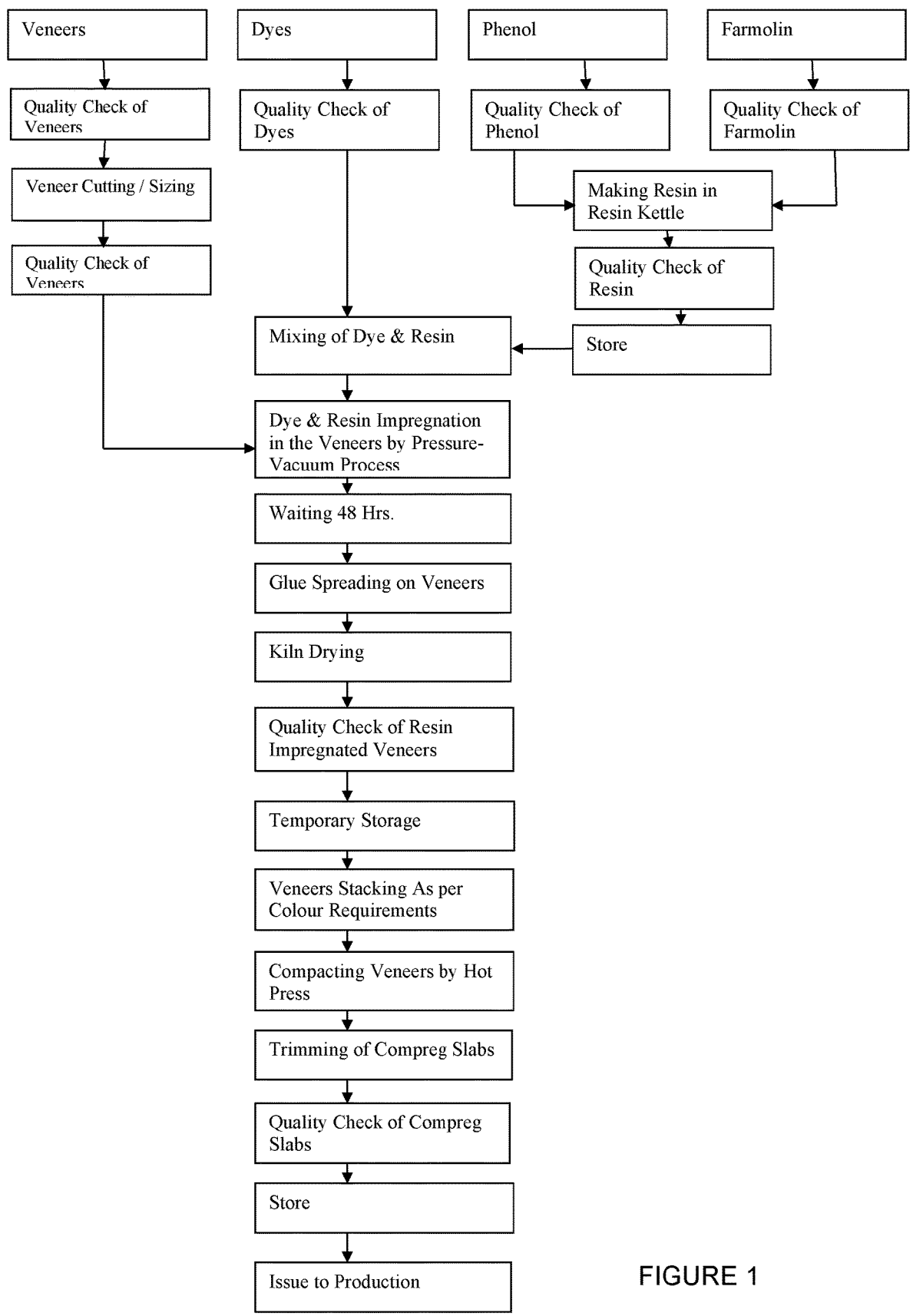
FIG. 1 is a flowchart which shows various steps involved in the process of manufacturing of compreg laminated wood.

The main objective of the present invention is to provide a process of manufacturing of compreg laminated wood and transforming the wood thus obtained to ornamental and utility products including jewelry, house decor, kitchenware, tableware, furniture, sporting goods and the like such that the final products are attractive in appearance and possess natural high gloss.

Another objective of the present invention is to provide a process including the steps of manufacturing of compreg laminated wood and transforming the wood thus obtained to ornamental and utility products includes: quality checking, veneer selection, impregnation of veneer with solution of dye and thermosetting resin, drying in kiln, glue spreading and bunching, followed by hot pressing and natural cooling resulting in creation of slab, thereafter trimming & cutting of slabs into strips of small sizes, shaping drawing on the sheet as per the profile required, shaping and profiling by CNC Router Machines, grinding and shaping by expert craftsman to bring out the color patterns, end rounding for smooth edges, grinding using various grits of emery wheels for surface finish, polishing/buffing for mirror like surface finish.

Another objective of the present invention is to provide a process of manufacturing of compreg laminated wood for using in and transforming the wood thus obtained to ornamental and utility products, where impregnation is performed in specifically designed vessels having both vacuum and pressure systems fitted in a manner that each cycle of impregnation run independently and simultaneously in the same vessel without taking out veneers from the solution of resin and dye.

Another objective of present invention is to provide a process of manufacturing of compreg laminated wood and transforming the wood thus obtained to ornamental and utility products, where drying of wood veneer is performed by kiln drier in a specifically programmed chamber equipped with PLC controller to regulate temperature and humidity throughout the drying cycle.

Yet another objective of the present invention is to provide process of manufacturing of compreg laminated wood and transforming the wood thus obtained to ornamental and utility products, where one of the final product manufactured is multi-coloured wood which is thereafter used to make gems of wood such that multiple layers of coloured wood are made visible in distinctive pattern, resulting in attractive applications such as making of multi color wooden gems for jewelry making, products of home decors, tableware, gardening, accessories, beauty accessories, furniture, kitchenware items, construction and interiors.

Yet another objective of the present invention where veneers are obtained from the woods selected from birch, rosewood, teakwood, walnut, white cedar, mango, steam beech and poplar, preferably birch wood/steam beech is used due to its excellent absorption and white natural finish with grains.

Still yet another objective of the present is to provide a compreg laminated wood and transforming the wood thus obtained to ornamental and utility products, having various advantages that includes simple structure, low manufacturing cost, durable and attractive in designs, dustproof, weather resistant and water resistant.

These and other objectives of the present invention will be apparent from the drawing and descriptions herein. Every object of the invention is attained by at least one embodiment of the invention. However, no embodiment necessarily meets every object set forth herein.

DETAIL DESCRIPTION OF THE INVENTION

Figure 2:
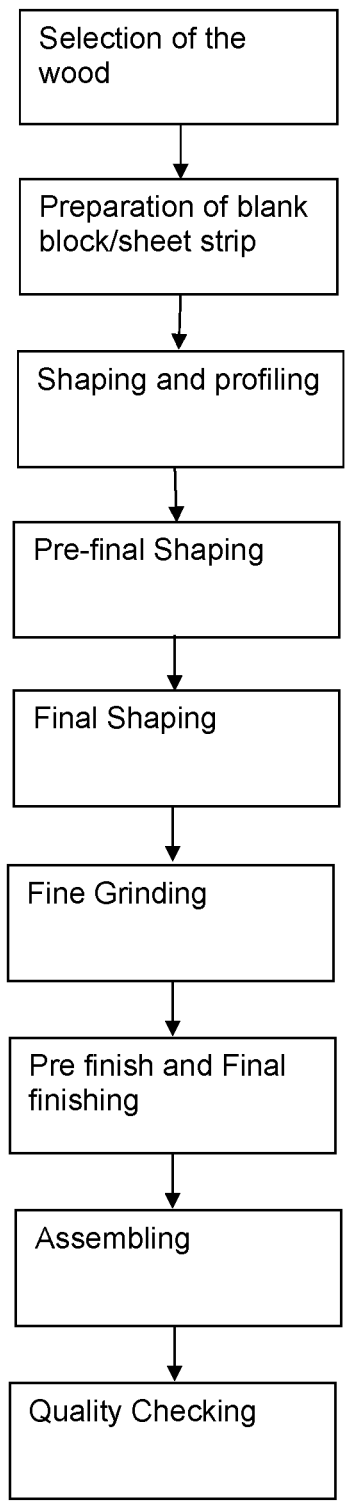
FIG. 2 is a flowchart which shows various steps involved in the process of manufacturing of wooden jewelry from compreg laminated wood.
Figure 3:
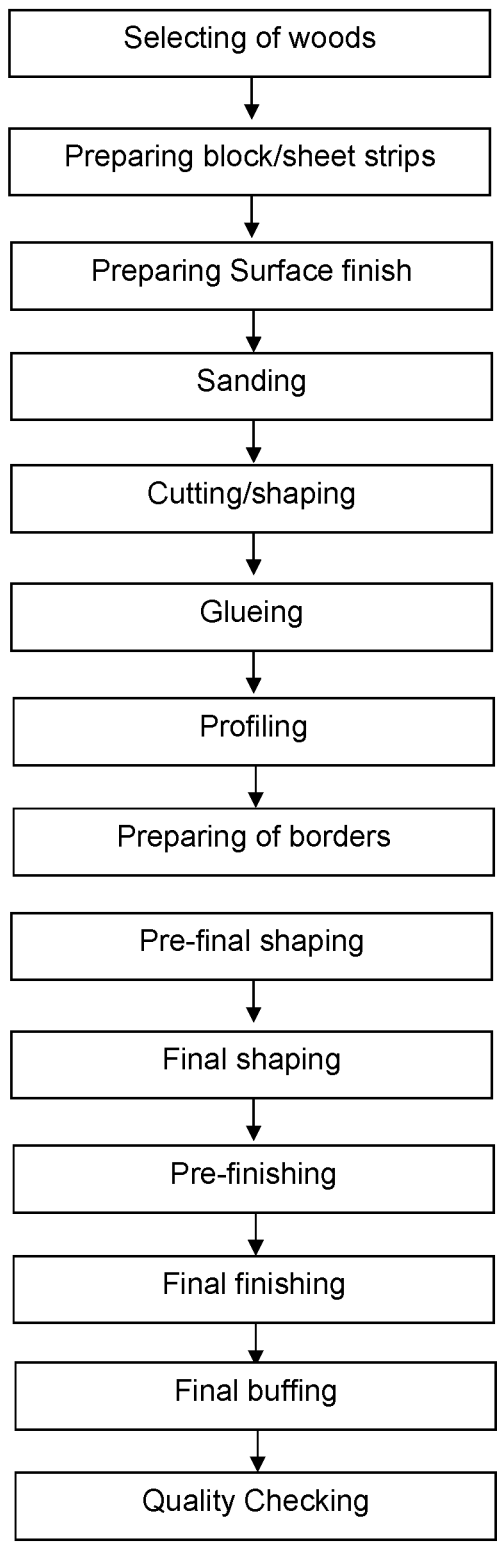
FIG. 3 is a flowchart which shows various steps involved in the process of manufacturing of compreg laminated wood, which is further used in making wooden decor.

The present invention will be described in detail by reference to the Figures. FIGS. 1 to 3 are for illustrations and not intended to limit the scope of the invention.

FIG. 1 shows various steps involved in the invention process of manufacturing of compreg laminated wood, which is further used in making various articles/products of utility, decor and ornamentation, including steps of Checking Quality:
The quality is checked thoroughly of the Veneer, Dyes, Phenol and Formalin. Veneer from the wood is analysed for deciding the grade A of veneer is used in the process of the invention. Further the veneer is subjected to cutting and sizing followed by a quality check again.

Mixing of Dye and thermosetting resin to obtain a solution/mixture.

Impregnation in veneer of the solution obtained above by pressure vacuum process.

Drying in a kiln-dryer with specific conditions.

Bunching: The glue is spread on the Veneers followed by cooling resulting in creation of slab. Further the quality check is conducted of resin impregnated Veneers. The veneers are thereafter stacked according to colour combination requirement in the slab followed by hot pressing.

Trimming & cutting of slabs from above step into strips of small sizes, shaping drawing on the sheet as per the profile required.

Shaping and profiling by CNC Router Machines, grinding and shaping by expert craftsman to bring out the color patterns, end rounding for smooth edges, grinding using various grits of emery wheels for surface finish, polishing/buffing for mirror like surface finish.

The invention process of manufacturing of compreg laminated wood, where impregnation step is performed in specifically designed vessels having both vacuum and pressure systems fitted in a manner that each cycle of impregnation run independently and simultaneously in the same vessel without taking out veneers from the solution of resin and dye. Further, drying step of wood veneer is performed by kiln drier in a specifically programmed chamber equipped with PLC controller under specific temperature and humidity. The final product manufactured is multi-coloured wood which is thereafter used to make gems of wood such that multiple layers of coloured wood are made visible in distinctive pattern.

The process of manufacturing compreg laminated wood as explained in current invention starts with Checking Quality step in which the wood is selected from types of wood including but not limited to rosewood, birch, teakwood, walnut, white cedar, mango, steam beech, popular, or birch wood is used. In the quality check it is assured that the wood selected is either A grade, B grade or ABC+ grade and that are free from any type of harmful knots and any other defects. The wood thus selected from A or AB or ABC+ grade comes from that part of the tree that has best grain and colour adding to the overall quality of the final slab/product. Later, these veneers are taken in a bunch which may include 4 to 55 veneers with a thickness range of 0.50 to 2.50 mm. To ensure the quality of the slab further, a quality check is carried out for dyes, phenol and formalin that are mixed to prepare resin.

Specifically the resin is prepared by mixing phenol in the range of 90 kg to 110 kg, formalin in the range of 140 kg to 160 kg, caustic soda in the range of 4 to 6 kg and water in the range of 7 to 9 litres. This ratio depends on the weather conditions i.e. winter and summer ratios are different. It also varies from colour to color depending on the depth and the brightness to be achieved.

Further, at impregnation step, the veneer is impregnated in specially designed vessels by inserting a solution of prepared resin & dye into the pores/veins of wooden veneers under the action of vacuum of 25 to 30 inch of mercury for 1 to 3 hours at a pressure of 6.0 to 7.50 kgs/square cm for 3 to 5 hours. The specially designed vessels herein, are equipped with vacuum and pressure systems in manner that each cycle can run independently and at the same time in the same vessel without taking out the veneers that are dipped in the solution of resin and dye. Additionally, the vacuum and pressure can be controlled according to the need. These vacuum-pressure treated veneers are then cured in kiln which takes out all the moisture absorbed during the impregnation process.

The kiln drier used in the present invention is a specially programmed chamber with PLC controller to ensure that the heat is evenly spread across the chamber and the temperature does not exceed 70° C. at any point of time. Each veneer in a batch is uniformly dried and attains a moisture content of 4% to 6%. If it is not performed in such a manner then, the veneers will not bond properly at later stages, leading to poor quality of final product/slab.

After kiln drying of veneers, the quality of resin impregnated veneers are checked and desired quality veneers are stacked in a bunch as per color-scheme requirements. Further, the compreg slab is prepared by compacting veneers by hot pressing the entire bunch at a pressure of 800-1000 psi under the temperature ranging between 130° C. to 155° C. (depending on the thickness of the slab). When the temperature reaches in the above mentioned range, the veneer bunch is put on the cooling mode to counteract the temperature rise due to exothermic reaction and slab will be cooled to a temperature in the range between 40° C. to 60° C. Beyond the temperature of 40° C. to 60° C. it is allowed to cool under natural conditions. The whole cycle of cooling takes 4 to 5 Hours. The original density of wood veneers used is 0.55 to 0.60, the density of solution of resin & dye is 1.08 to 1.10; the final density of compressed wood reaches up to 1.30. The slab is then trimmed from the sides on high speed circular cutters to give it a perfect edge to edge shape.

FIG. 2 shows various steps involved in the invention process of manufacturing of wooden jewelry from compreg laminated wood:

- Selection of the wood: The process of manufacturing utility and home decor products as explained in current invention starts with selecting of wood step in which the wood is selected from types of wood including but not limited to rosewood, birch, teakwood, walnut, white cedar, mango, steam beech, popular, or birch wood is used.
- Preparation of blank block or sheet strip: From the slab to obtain the gems to be used in jewelry in the desired shape and size, the compreg slabs are prepared from the blank block by cutting into strips of small sizes. In the process of preparing block/sheet strips it is assured that the wood selected is either A grade or AB grade or ABC+ grade comes from that part of the tree that has best grain and color adding to the overall quality of the final slab/product.
- Shaping and profiling: For mass production the shaping and profiling functions are performed by CNC Router Machines. The CNC Routers used are of 2-axis, 3-axis or even multi axis for profiling of desired shapes, if required, by angular changes/rotation of the desired shape. In one exemplary case for cutting, shaping and profiling compreg slab into a wooden jewelry a 3-axis CNC Router is used alternatively, 3rd axis shaping could be done manually also using hand tools. Manual shaping and profiling is performed by marking the profile & then cutting by hack-saw, filing, sanding, grinding, template profiling, jig-saw & band saw. After obtaining the required shape either by manual process or with CNC routers, the product is then manually grinded on specially designed grinding machines in such a manner that the multicolour layers appear in steps on the compreg slab providing an attractive appearance to the slab.
- Pre-final shaping of product is performed by feature machining, drilling, boring turn and Milling.
- Final shaping of product is performed by grinding and sanding.
- Fine grinding is performed by the skilled craftsman manually by cutting a piece of slab, shapes artfully which originally has sheet strips angles ranging from 5 to 20 degree, grinds the wood to desired shape with conceptualised patterns.
- Pre finish and Final finishing of the required shape is carried by fine sanding or light grinding & polishing. The shaped article is subjected to polishing with ceramic paste and wooden media followed by manual polishing by wax, stearic acid, aluminium oxide and emery to give a uniform smooth & glossy surface.
- Assembling: The outcome of final finishing is then subjected to gluing, bezelling and fitting to get the desired jewelry items.
- Quality Checking: To ensure the quality of final product.

FIG. 3 shows various steps involved in the invention process of manufacturing of compreg laminated wood, which is further used in making wooden decor, including steps of

- Selecting of woods: The process of manufacturing utility and home decor products as explained in current invention starts with selecting of wood step in which the wood is selected from types of wood including but not limited to rosewood, birch, teakwood, walnut, white cedar, mango, steam beech, popular, or birch wood is used.
- Preparing block/sheet strips:
  From the slab to obtain the gems to be used in jewelry in the desired shape and size, the compreg slabs are prepared from the blank block by cutting into strips of small sizes. In the process of preparing block/sheet strips it is assured that the wood selected is either A grade or AB grade or ABC+ grade comes from that part of the tree that has best grain and color adding to the overall quality of the final slab/product.
- Preparing Surface finish: Planner machines are used for surface finish of block.
- Sanding: To improve the surface finishing of the block, sanding is performed by surfacers or by manual polishing.
- Cutting/shaping: Cutting of finished block is performed by Jig Saw machine to obtain the required size and shape of the blocks.
- Gluing: The glue is spread on the blocks to prepare the slab.
- Profiling: From the slab to obtain the desired shape and size, the compreg slabs are cut into strips of small sizes. For mass production the shaping and profiling functions are performed by CNC Router Machines. The CNC Routers used are of 2-axis, 3-axis or even multi axis for profiling of desired shapes, if required, by angular changes/rotation of the desired shape. In one exemplary case for cutting, shaping and profiling compreg slab into a decor product a 3-axis CNC Router is used alternatively, $3^{rd}$ axis shaping could be done manually also using hand tools.
- Preparing of borders: Moulding machines are used to prepare the borders for product such as photo frames, napkin holders, plates etc.
- Pre-final shaping of product is performed by lathe machines followed by drilling, boring and milling.
- Final shaping of product is performed by the skilled craftsman by cutting a piece of slab, shapes artfully which originally has sheet strips angles ranging from 5 to 20 degree, grinds the wood to desired shape with conceptualised patterns.
- Pre-finishing of product is performed by rough sanding.
- Final finishing of the product is then manually grinded on specially designed grinding machines in such a manner that the multicolour layers appear in steps on the compreg slab providing an attractive appearance to the product.
- Final buffing: The shaped article is subjected to polishing with ceramic paste and wooden media followed by manual polishing by wax, stearic acid, aluminium oxide and emery to give a uniform smooth & glossy surface.
- Quality Checking: To ensure the quality of final product.

In a preferred embodiment of the invention, a bunch of veneer of birch wood with A/AB/ABC+ quality having thickness of approximate 1.47/1.50 mm is impregnated by a solution of resin & dye in a specially designed vessel under vacuum of 25-30 inch of mercury for 1-3 hours at pressure of 6.00-7.50 kgs/square cm for 3-4 hours. The impregnated veneer bunch so obtained is passed through a kiln drier under 7000 temperature and attains moisture content up to 5%. After drying of veneer, the slab is manufactured by hot pressing tie stack of veneers evenly at a pressure of 800-1000 psi in a temperature range of 130-155 C. When the core temperature reaches the range the cooling cycle is started till the temperature falls to 60° C. and below. This may take 4 to 5 hours depending upon the ambient conditions. The wood thus obtained in this process is having density of 1.30.

After cooling of impregnated wood, the skilled craftsman thereafter cuts a piece of slab, shapes artfully which originally has veneer layer angles ranging from 5 to 20 degree, grinds the wood to desired shape with conceptualised patterns. The craftsman further decides the angle & curves based on the final design expected from the slab.

The grinding is performed in such a manner that all multicolour layers appear in wooden product preferably in chevron and other geometrical patterns like ellipse/circle/pyramid. Further the size of the chevron patterns depends upon the angle at which the grinding is performed. The current invention provides that the smaller the angle, larger is the chevron pattern. For finishing of the wooden product, it is polished by ceramic paste & wooden media followed by manual polishing by wax, stearic acid, aluminium oxide and emery.

According to an embodiment of the present invention, the final wooden product is created by trimming, cutting, grinding and polishing of single compreg wooden slab in desired shape and size, displaying smooth and attractive patterns in which each color stand out layer by layer.

In a preferred embodiment of the present invention, the final product obtained after grinding and polishing of compreg slab is transformed into multi color wooden gems for making attractive jewelry items and beauty accessories, including pendants, handcuffs and bangles, rings, earrings and the like, such that the smooth patterns of all colors are displayed layer by layer.

In another preferred embodiment of the present invention, the final product obtained after grinding and polishing of compreg slab is transformed into products of utility including home decors, tableware, gardening, furniture, accessories, kitchenware items, construction and interiors.

In an embodiment of the present invention, the resin is prepared by mixing 100 kg of phenol, 150 kg farmolin and 5 kg caustic soda in 7.5 litres of water.

In another embodiment of the present invention, veneers used in the current invention process are obtained from the woods selected from birch, rosewood, teakwood, walnut, white cedar, mango, steam beech and poplar, preferably birch wood is used due to its excellent absorption and white natural finish with grains.

In one exemplary case, wooden jewelry made from compreg laminated wood is passed through various tests such as water absorption, swelling/shrinkage after keeping said jewelry under water for 72 hours. The test results shows that it may absorb water max up to 10% by weight, the size swelled by 5% and shrinkage in dimension are noted up to 2% only.

The aforesaid compreg laminated wood has diverse applications such as Jewelry, home decor, gift items, tableware, gardening accessories, beauty accessories, kitchen items, construction and interiors, etc.

The advantages of the invention process of compreg laminated wood and transforming the wood thus obtained to ornamental and utility products, include simple structure, low manufacturing cost, durable and attractive in designs, dustproof, weather resistant and waterproof due to which they have a long life.

Although the invention has been described with reference to specific embodiments, this description is not meant to be construed in a limiting sense. Various modifications of the disclosed embodiments, as well as alternate embodiments of the invention, will become apparent to persons skilled in the art upon reference to the description of the invention. It is therefore contemplated that such modifications can be made without departing from the spirit or scope of the present invention as defined.

I claim:
1. A process for manufacturing of compreg laminated wood and transforming the wood thus obtained to ornamental and utility products, comprising the steps of:
   checking quality of veneer, dyes, thermosetting resin comprising of mixture of phenol and farmolin;
   mixing of dye and thermosetting resin to obtain a solution/mixture;
   impregnation in veneer of said solution by pressure vacuum process; wherein impregnation is performed in specifically designed vessels;
   drying in a kiln drier; wherein kiln drier comprises of PLC controlled chamber to regulate rate of drying and retaining requisite amount of moisture content;
   bunching: The glue is spread on the veneers followed by bunching of veneers;
   stacking: The veneers are thereafter stacked according to color requirement in the slab followed by hot pressing; wherein said hot pressing is done at uniform pressure evenly distributed over full area of veneer stack;
   trimming and cutting of said slabs into strips of small sizes, and shaping drawing on the sheet as per the profile required;
   shaping and profiling: cutting, shaping and profiling of the slab into desired shape and size by CNC router machines;
   grinding and polishing of said desired shapes to provide color and shine.

2. The process for manufacturing of compreg laminated wood and transforming the wood thus obtained to ornamental and utility products, as claimed in claim 1, wherein said veneer is obtained from the wood selected from birch, rosewood, teakwood, walnut, white cedar, mango, steam beech and poplar.

3. The process for manufacturing of compreg laminated wood and transforming the wood thus obtained to ornamental and utility products, as claimed in claim 1, wherein wood used to obtain said veneer is birch wood.

4. The process for manufacturing of compreg laminated wood and transforming the wood thus obtained to ornamental and utility products, as claimed in claim 1, wherein said vessel is equipped with vacuum & pressure systems such that each cycle of said impregnation run independently at the same time in the same vessel without taking out veneers from the solution of resin and dye.

5. The process for manufacturing of compreg laminated wood and transforming the wood thus obtained to ornamental and utility products, as claimed in claim 1, wherein said vessels are designed in such a manner that impregnation is performed under vacuum of 25 to 30 inch of mercury for 1-3 hours at pressure of 6.0 to 7.50 kgs/square cm for 3-4 hours.

6. The process for manufacturing of compreg laminated wood and transforming the wood thus obtained to ornamental and utility products, as claimed in claim 1, wherein said PLC controlled chamber in said kiln drier spreads equal heat in said chamber and regulates the temperature up to 70° C.

7. The process for manufacturing of compreg laminated wood and transforming the wood thus obtained to ornamental and utility products, as claimed in claim 1, wherein said compreg slab is created by said hot pressing at the centre of said bunch at a temperature ranges between 130° C. to 155° C. under pressure of 800 psi to 1000 psi.

8. The process for manufacturing of compreg laminated wood and transforming the wood thus obtained to ornamental and utility products, as claimed in claim 1, wherein said grinding is performed in such a manner that smaller angle results into large geometrical patterns.

9. The process for manufacturing of compreg laminated wood and transforming the wood thus obtained to ornamental and utility products, as claimed in claim 1, wherein polishing material is selected from ceramic paste, wooden media, cloth buffs, polishing compounds made from wax, stearic acid, aluminium oxide, emery and vibratory bowls and the combination thereof.

* * * * *